(12) United States Patent
Leung

(10) Patent No.: US 12,241,273 B2
(45) Date of Patent: Mar. 4, 2025

(54) POOL HOSE AND POOL PUMP APPARATUSES AND METHODS

(71) Applicant: Belgravia Wood Limited, Hong Kong (HK)

(72) Inventor: Alan Leung, Central (HK)

(73) Assignee: Belgravia Wood Limited, Central (HK)

( * ) Notice: Subject to any disclaimer, the term of this patent is extended or adjusted under 35 U.S.C. 154(b) by 105 days.

(21) Appl. No.: 17/443,237

(22) Filed: Jul. 22, 2021

(65) Prior Publication Data
US 2023/0026550 A1    Jan. 26, 2023

(51) Int. Cl.
*E04H 4/12*    (2006.01)
*F16K 51/00*    (2006.01)

(52) U.S. Cl.
CPC ......... *E04H 4/1245* (2013.01); *E04H 4/1281* (2013.01); *F16K 51/00* (2013.01)

(58) Field of Classification Search
CPC ... E04H 4/1245; E04H 4/1209; E04H 4/1281; E04H 4/0018; E04H 4/0025; E04H 4/0031; E04H 4/0037; E04H 4/0056; E04H 4/0062; E04H 2004/0068
See application file for complete search history.

(56) References Cited

U.S. PATENT DOCUMENTS

| | | | | |
|---|---|---|---|---|
| 3,749,244 A * | 7/1973 | Jannuzzi, Jr. | ......... | E04H 4/0043 210/206 |
| 3,864,262 A * | 2/1975 | Lang | ..................... | E04H 4/1209 210/167.14 |
| 3,986,217 A * | 10/1976 | Doerr | ..................... | A61H 33/60 4/541.4 |
| 8,262,906 B2 * | 9/2012 | Davidson | .............. | E04H 4/1272 210/167.15 |
| 2007/0107117 A1 * | 5/2007 | Casolco | ................... | E04H 4/12 4/496 |

FOREIGN PATENT DOCUMENTS

EP    1138307 A2 * 10/2001   ......... A61H 33/0087

* cited by examiner

*Primary Examiner* — Erin Deery
(74) *Attorney, Agent, or Firm* — Finnegan, Henderson, Farabow, Garrett & Dunner LLP

(57) ABSTRACT

Embodiments of the present disclosure provide systems and methods for a pool pump and one or more pool hoses. The pool pump may be connected to the pool through the one or more pool hoses. The system provides a pool pump comprising an outlet and an inlet. The inlet may connect to a first inlet hose. The first inlet hose may connect the pool pump to a three-way connection to the pool. The three-way connection may connect the first inlet hose to a second inlet hose and be in fluid connection with an interior of the pool. In some embodiments, the three-way connection may be attached to the pool.

21 Claims, 4 Drawing Sheets

POOL HOSE AND POOL PUMP APPARATUSES AND METHODS

FIELD OF THE INVENTION

The presently disclosed subject matter generally relates to systems and methods for pool hoses and pool pumps.

BACKGROUND

A variety of pools use a pump to circulate and/or filter a liquid. In some cases, the pump is connected to the pool through a number of hoses that may use a corresponding number of fittings. For certain types of pools, suction fittings may be used to connect the hoses to a liner of a pool. Such fittings may meet a standard for suction fittings under ANSI/APSP/ICC-16 2017.

Some pools may be above-ground pools that include a liner supported by a frame. The liner may include the liquid of the pool for recreation, training, or the like. Above-ground pools may be conveniently assembled and disassembled for quick transport. Above-ground pools may be placed in a number of locations without the need for digging for or placing concrete or more permanent structures.

Known pumps and hoses use multiple inlet hoses that connect the pump to the liner or an access point to the interior of the liner. A number of inlet hoses may connect the pump to the pool through the use of suction fittings. A number of inlet hoses may be positioned so that the liquid may be pulled to the pump from different suction fittings. It is desirable to reduce a number of components and to simplify installation. It is also desirable to provide a number of sensors to monitor the liquid of the pool. It is also desirable to provide a pump system that may be quickly connected and disconnected so that a movable pool may be assembled or disassembled easily and conveniently.

SUMMARY

Briefly described, embodiments of the presently disclosed subject matter relate to systems and methods for a pool hub.

An exemplary aspect of this disclosure relates to a pool assembly. The pool assembly may comprise a pool, a pump configured to provide a liquid to the pool at a pressure, an outlet hose connecting the pool to the pump, and an inlet hose connecting the pool to the pump. In some embodiments, the inlet hose may extend from the pump to the pool. In some embodiments, the inlet hose may comprise a first inlet hose and a second inlet hose.

In some embodiments, the inlet hose may comprise a first inlet fitting connecting the inlet hose to the pool. In some embodiments, the first inlet fitting may be configured to receive the liquid from the first inlet hose. In some embodiments, the first inlet fitting may be configured to provide the liquid to the second inlet hose. In some embodiments, the first inlet fitting may be attached to a sidewall of the pool. In some embodiments, the second inlet hose may connect the first inlet fitting to a second inlet fitting.

In some embodiments, the second inlet fitting may be attached to a sidewall of the pool. In some embodiments, the first inlet fitting may comprise a valve configured to shut off a flow of the liquid to the pool. In some embodiments, the first inlet fitting may comprise a valve configured to shut off a flow of the liquid to the second inlet hose. In some embodiments, the outlet fitting may comprise a valve configured to shut off a flow of the liquid. In some embodiments, the pump may be configured to filter the liquid. In some embodiments, the pump may be configured to mix chemicals into the liquid. In some embodiments, the first inlet fitting may be configured to measure the pressure of the liquid.

Another exemplary aspect of this disclosure relates to a pool. In some embodiments, the pool may comprise a sidewall, a pump configured to receive the liquid, an outlet hose configured to provide a first liquid connection between an interior of the sidewall and the pump, a first inlet hose configured to provide a second liquid connection between the interior of the sidewall and a first inlet fitting. In some embodiments, the pump may be configured to process the liquid. In some embodiments, the first inlet fitting may be attached to the sidewall.

In some embodiments, the second inlet hose may be configured to provide a third liquid connection between the first inlet fitting and a second inlet fitting. In some embodiments, the second inlet fitting may be attached to the sidewall. In some embodiments, the first inlet fitting comprises a valve configured to shut off a flow of the liquid to the pool. In some embodiments, the first inlet fitting comprises a valve configured to shut off a flow of the liquid to the second inlet hose. In some embodiments, the outlet fitting comprises a valve configured to shut off a flow of the liquid. In some embodiments, the pump is configured to filter the liquid. In some embodiments, the pump is configured to mix chemicals into the liquid.

Another exemplary aspect of this disclosure relates to a method of providing liquid to a pool. In some embodiments, the method may include steps of providing a first liquid connection through an outlet hose, wherein the outlet hose provides a first liquid connection between a pump and a volume of a liquid within a sidewall of the pool; providing a second liquid connection through a first inlet hose, wherein the first inlet hose connects the pump to a first inlet fitting, wherein the first inlet fitting is attached to the sidewall; providing a third liquid connection through a second inlet hose, wherein the second inlet hose connects the first inlet fitting to a second inlet fitting. In some embodiments, the pump is configured to filter the liquid. In some embodiments, the pump is configured to mix chemicals into the liquid. In some embodiments, the first inlet fitting is configured to measure a pressure of the liquid.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

Figure 1:
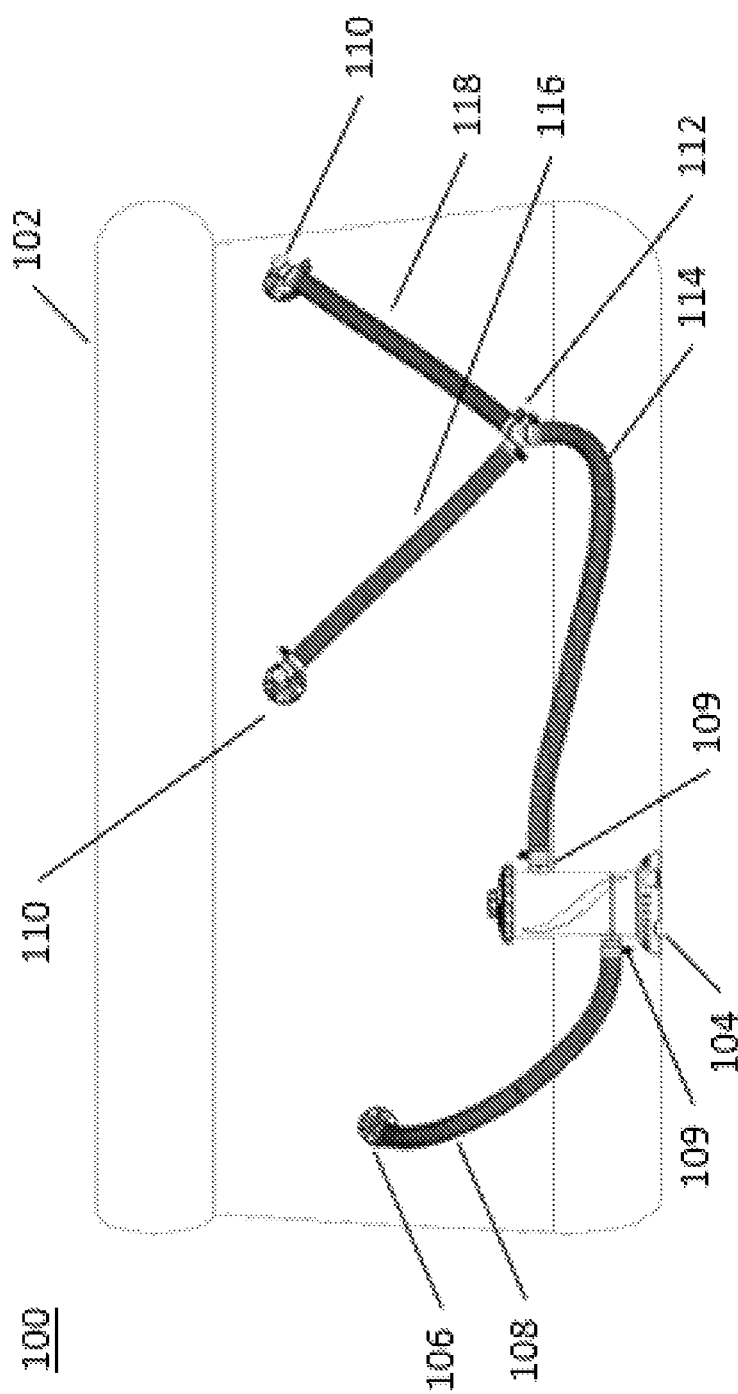
FIG. 1 illustrate a pool assembly according to some embodiments of the present disclosure.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems and methods for the operation of a pool pump.

Exemplary disclosed embodiments include apparatuses, systems, and methods for providing a liquid connection between a pump and a pool. For example, in some embodiments, a pool pump may be in liquid connection with a pool. The pool pump may be configured to provide liquid to the pool and/or circulate liquid. The pool pump may be configured to generate and/or maintain a pressure of the liquid through the pool pump. In some embodiments, the pool may be inflatable. In some embodiments, the pool may be a spa. The pool may contain a liquid. The pool may comprise a pool liner that contains the liquid. The pool liner may comprise a side portion. In some embodiments, the pool may comprise a sidewall comprising a rigid plastic and/or an inflatable portion. Sidewalls may refer to a wall of the pool including a side or a bottom. The pool pump may include an outlet and an inlet.

Hoses described herein may include one or more of a flexible hose and a rigid hose. The outlet may connect to an outlet hose. The inlet may connect to a first inlet hose. The first inlet hose may connect the pool pump to a first two-way connection to the pool. The second inlet hose may connect the pool pump to a three-way connection to the pool and a third hose. The three-way connection may be attached to the pool. The third inlet hose may connect the three-way connection to a second two-way connection to the pool. The two-way connection and the three-way connection may each be configured to provide liquid connectivity with one or more of the pump, the pool, the outlet hose, the first inlet hose, second inlet hose, and third inlet hose. The two-way connections and the three-way connection may each be configured to shut off a flow of the liquid. Each of the two-way connections and the three-way connection may comprise a valve. One or more features of the hoses and quick-disconnects may allow for the quick assembly and/or disassembly of an above-ground pool. The configuration of hoses and connections described herein may reduce a number of components required for a pool assembly and increase efficiency.

Each of the two-way connections and the three-way connections may comprise a sensor to measure a state of the liquid. In some embodiments, hoses and/or inlets or outlets of the pool pump may include one or more of the sensors described herein. The flow state of the liquid may comprise whether the liquid is flowing, whether a blockage has occurred, or a speed of the liquid. Each of the two-way connections and the three-way connections may comprise an LED configured to indicate a state of the liquid based on one or more sensors, for example, whether the liquid is flowing or a blockage has occurred, whether a predetermined threshold pressure has been reached, a temperature, a pressure, a chemical composition, a pH, or whether a predetermined threshold speed has been reached. Sensors may be configured to notify a processor associated with a pump that a blockage has occurred. The processor associated with the pump may send and/or receive signals from the sensors. The pump may include a processor configured to send, receive, and/or process information from the sensors and/or send information to an application associated with the processor or an external communication device. The information may include an alert that the blockage has occurred, to turn off the pump until the blockage is cleared, a state of the liquid, and/or to adjust a flow of liquid in the pump to clear the blockage. The alert may notify one or more recipients through the application. The flow of liquid in the pump may be adjusted through an increase or decrease in the liquid pressure generated by the pump.

Referring now to the figures, wherein like reference numerals represent like parts throughout the views, the pool assembly will be described in detail. FIG. 1 illustrates a pool assembly according to some embodiments of the present disclosure.

Specifically, FIG. 1 illustrates exemplary pool assembly 100 in accordance with some embodiments of the present disclosure. Pool assembly 100 may include liner 102. Pool assembly 100 may include pool pump 104. In some embodiments, pool pump 104 may be configured to filter a liquid contained within liner 102, for example, to remove debris and/or particulates. In some embodiments, pool pump 104 or a liquid heater connected to pool pump 104 may be configured to heat the liquid. In some embodiments, pool pump 104 may be configured to mix chemicals into the liquid, for example, to treat the liquid by introducing an amount of chemical mixture. In some embodiments, pool pump 104 may be configured to release the chemical mixture into the liquid over time. Pool pump 104 may stand beside a pool. Pool pump 104 may be attachable to a base configured to be placed by the pool. In some embodiments, pool pump 104 may be attachable to one or more of a frame of a pool or liner 102. Pool assembly 100 may include one or more of first hose 108, second hose 114, third hose 116, and fourth hose 118. One or more of hoses 108, 114, 116, and 118 may be configured to provide a liquid connection between one or more of the liquid within liner 102, pool pump 104, and hoses 108, 114, 116, and 118.

First hose 108 may connect to an outlet 109 of pool pump 104. First hose 108 may connect to an outlet two-way connection 106. Outlet two-way connector 106 may be configured to mount to liner 102, a sidewall, or a frame. Outlet two-way connector 106 may be configured to include a quick-attach mechanism such as a latch, a threaded attachment, or a hose clamp. Outlet two-way connection 106 may contain one or more of a temperature sensor, a pressure sensor, a flow velocity sensor, a pH sensor, a chemical composition sensor, and a valve. Second hose 114 may connect to inlet three-way connection 112.

Inlet three-way connection 112 may be configured to mount to liner 102, a sidewall, or a frame. Inlet three-way connection 112 may be configured to include a quick-attach mechanism such as a latch, a threaded attachment, or a hose clamp. In some embodiments, inlet three-way connection 112 may not be mounted to a structure such as a frame or a liner. Inlet three-way connection 112 may contain one or more of a temperature sensor, a pressure sensor, a flow velocity sensor, and a valve. Third hose 116 may connect to inlet three-way connection 112 to inlet two-way connection 110. Inlet two-way connection 110 may be configured to mount to liner 102, a sidewall, or a frame. Inlet two-way connection 110 may be configured to include a quick-attach mechanism such as a latch, a threaded attachment, or a hose clamp. Inlet two-way connection 110 may contain one or more of a temperature sensor, a pressure sensor, a flow velocity sensor, a pH sensor, a chemical composition sensor, and a valve. Inlet two-way connection 110 may be configured to connect liner 102 to fourth hose 118. Inlet two-way connection 110 may contain one or more of a temperature sensor, a pressure sensor, a flow velocity sensor, and a valve.

Figure 2:
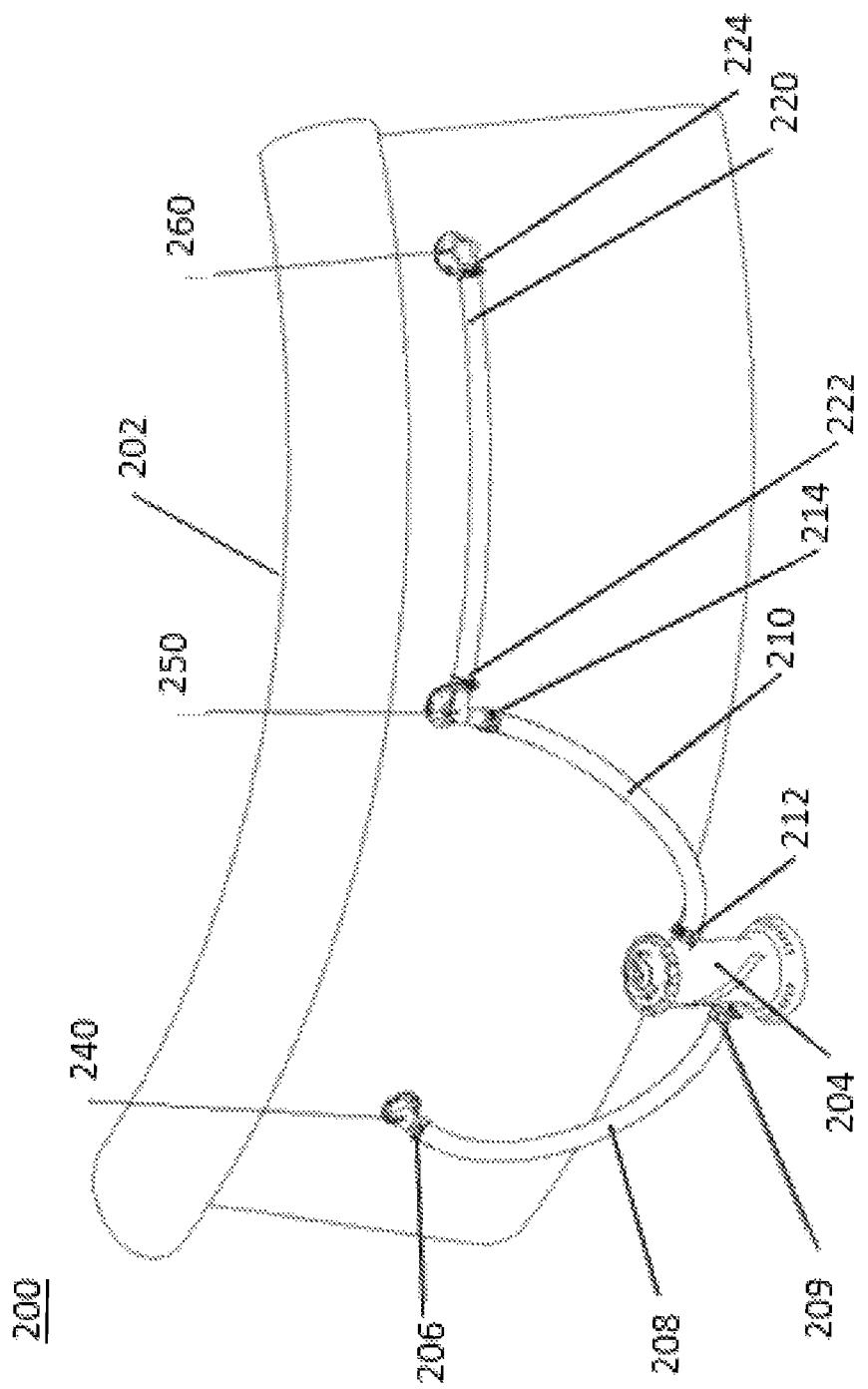
FIG. 2 illustrates a pool assembly according to some embodiments of the present disclosure.

FIG. 2 illustrates exemplary pool assembly 200, in accordance with some embodiments of the present disclosure. Certain features of pool assembly 200 may be similar to those of exemplary pool assembly 200 discussed with respect to FIG. 1. Pool assembly 200 may include one or more of first hose 208, second hose 210, third hose 220, input two-way connection 240, inlet three-way connection 250, and output two-way connection 260. One or more of hoses 208, 210, and 220 may be configured to provide a liquid connection between one or more of the liquid within liner 202, pool pump 204, and hoses 208, 210, and 220. Pool assembly 200 may include connections 206, 209, 212, 214, 222, 224 to connect one or more hoses 208, 210, 220 to one or more of pool pump 204, two-way connections 240, 260, and three-way connection 250. Connections 206, 209, 212, 214, 222, and 224 may include one or more of a clamp, a quick-attach mechanism, a latch, and a threaded attachment.

First hose 208 may connect to an outlet 209 of pool pump 204. First hose 208 may connect to an outlet two-way connection 206 at outlet connection 206. Outlet two-way connector 206 may be configured to mount to liner 202, a sidewall, or a frame. Outlet two-way connector 240 may be configured to include a quick-attach mechanism such as a latch, a threaded attachment, or a clamp. Outlet two-way connection 240 may contain one or more of a temperature sensor, a pressure sensor, a flow velocity sensor, a pH sensor, a chemical composition sensor, and a valve. Second hose 210 may connect outlet pump 204 to inlet three-way connection 250. Inlet three-way connection 250 may be configured to mount to liner 202, a sidewall, or a frame. Inlet three-way connection 250 may contain one or more of a temperature sensor, a pressure sensor, a flow velocity sensor, a pH sensor, a chemical composition sensor, and a valve. Third hose 220 may connect inlet three-way connection 250 to inlet two-way connection 260. Inlet two-way connection 260 may be configured to mount to liner 202, a sidewall, or a frame. Inlet two-way connection 260 may contain one or more of a temperature sensor, a pressure sensor, a flow velocity sensor, a pH sensor, a chemical composition sensor, and a valve.

Figure 3:
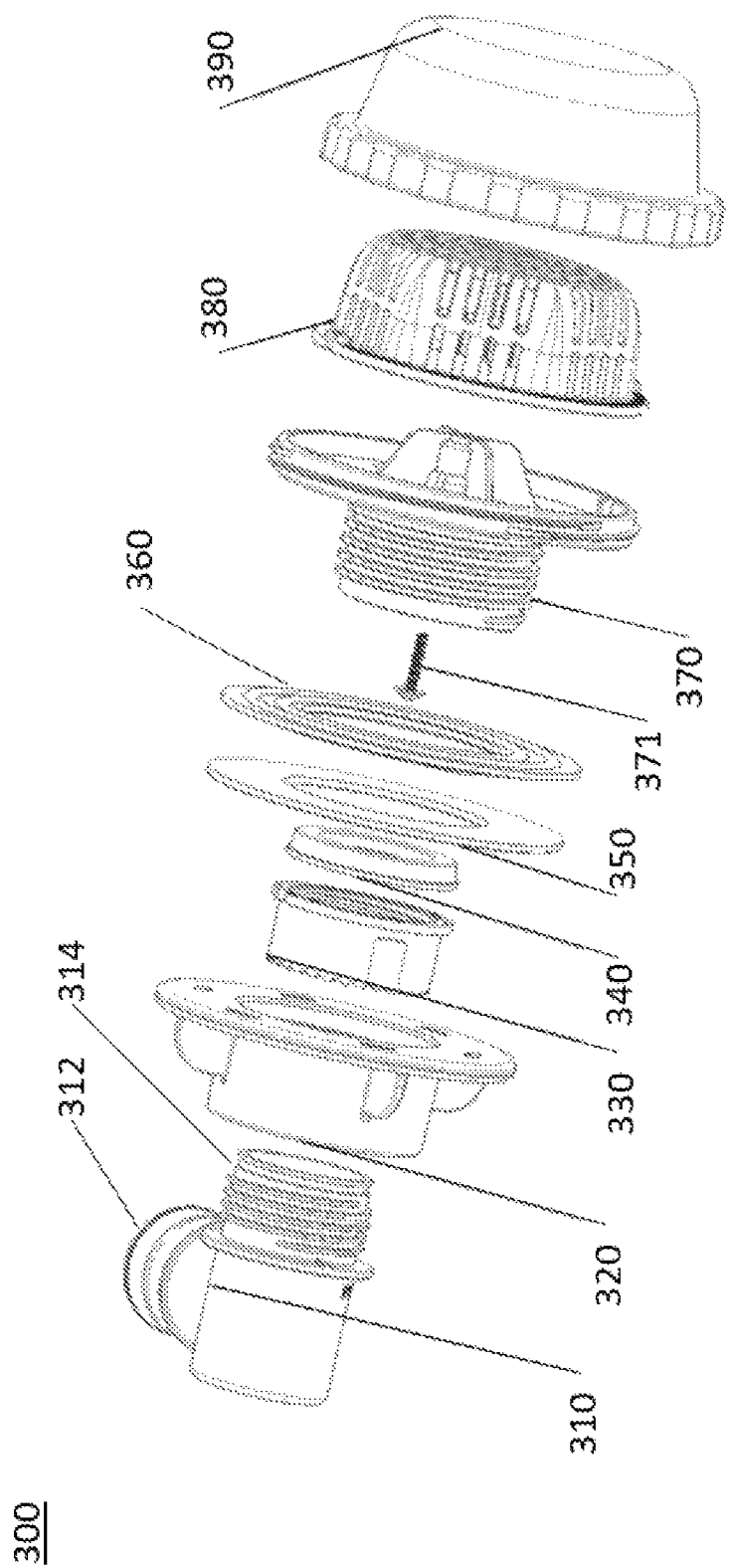
FIG. 3 illustrates a hose connector according to some embodiments of the present disclosure.

FIG. 3 illustrates pool connection assembly 300, in accordance with some embodiments of the present disclosure. Pool connection assembly 300 may be similar to outlet two-way connections or inlet two-way connections described with reference to FIG. 1 or FIG. 2. Pool connection assembly 300 may be configured to provide a two-way liquid connection between one or more of a pump, a hose, and a container of a pool. Pool connection assembly 300 may be configured to be a suction fitting. Pool connection assembly 300 may include two-tube section 310. Two-tube section 310 may include hose connection 312 and mounting connection 314. Hose connection 312 may be configured to connect to a hose for example, by a hose clamp, a threaded connection, and/or a quick-attach mechanism. Mounting connection 314 may be configured to connect to a liner, a frame, or an inflatable exterior of a pool. Two-tube section 310 may include an L-fitting, a straight fitting, an angled fitting, or have another geometric configuration.

Pool connection assembly 300 may include lock nut 320, connector nut 330, first gasket 340, thrust washer 350, second gasket 360, screw 371, fitting body 370, sleeve 380, and cap 390. Lock nut 320 may be configured to provide a flange on an outside of a frame, a liner, or a sidewall. Lock nut 320 may tighten against two-tube section 310 using a threaded connection. Connector nut 330 may tighten against two-tube section 310 using a threaded connection. Connector nut 330 may hold lock nut 320 against two-tube section 310. Fitting body 370 may attach to lock nut 320 via a threaded connection. Fitting body 370 may be configured to press first gasket 340, second gasket 360, and thrust washer 350 against lock nut 320 and/or connector nut 330. Cap 390 and sleeve 380 may be configured to keep debris or other blockages from blocking a flow of the liquid through pool connection assembly 300. Cap 390 may be configured to hold sleeve 380 against fitting body 370. Cap 390 may attach to fitting body 370 through a threaded attachment. Screw 371 may be configured to attach to fitting body 370 through a threaded attachment. Screw 371 may be configured to attach to one or more of sleeve 380 and cap 390.

Figure 4:
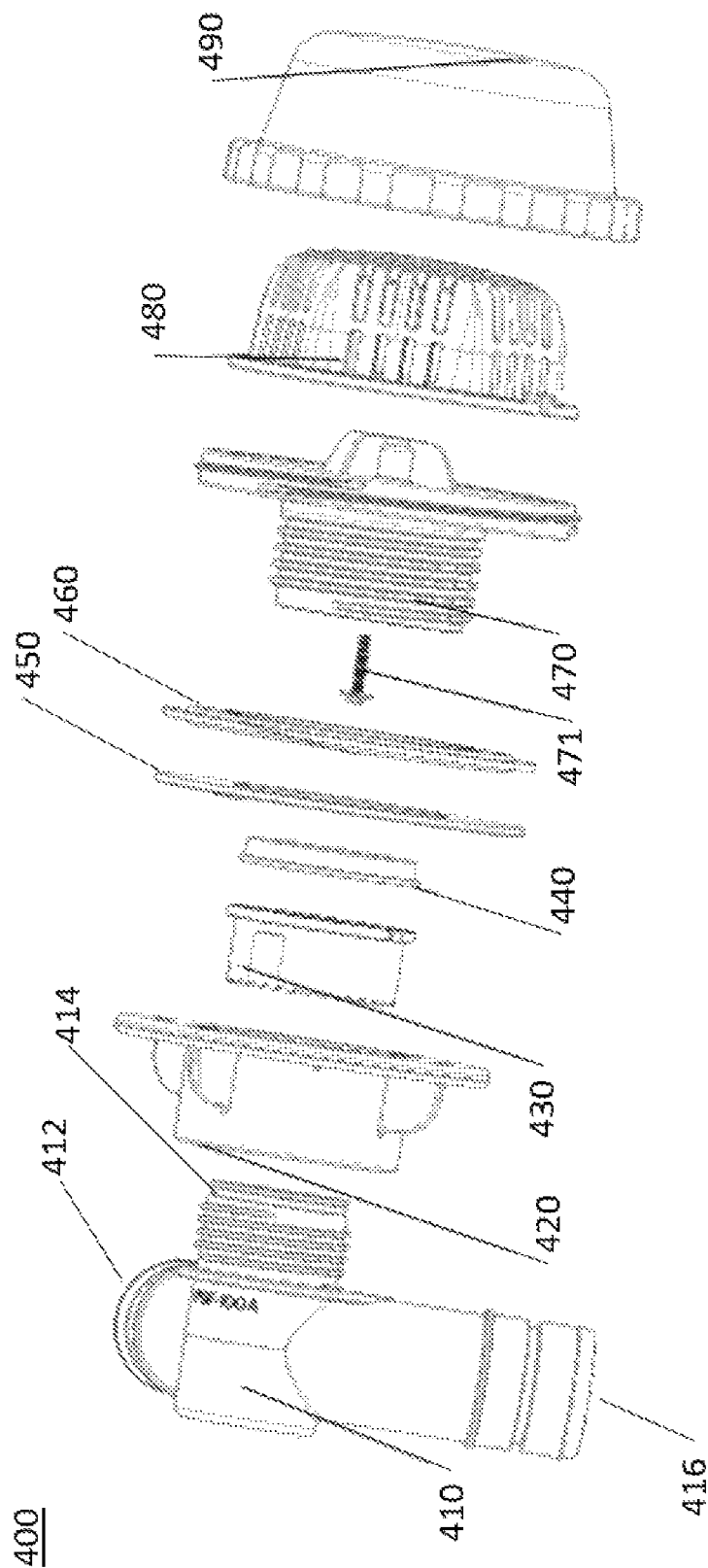
FIG. 4 illustrates a hose connector according to some embodiments of the present disclosure.

FIG. 4 illustrates another pool connection assembly 400, in accordance with some embodiments of the present disclosure. Pool connection assembly 300 may be similar to inlet three-way connection 250 described with reference to FIG. 2. Pool connection assembly 400 may be configured to provide a three-way liquid connection between one or more of a pump, a hose, and a container of a pool. Pool connection assembly 400 may be configured to be a suction fitting. Pool connection assembly 400 may include three-tube section 410. Three-tube section 410 may include hose connections 412 and 416 and mounting connection 414. Mounting connection 314 may be configured to connect to a liner, a frame, or an inflatable exterior of a pool. Hose connections 412 and 416 may each be configured to connect to a hose for example, by a hose clamp, a threaded connection, and/or a quick-attach mechanism. Three-tube section 410 may include an L-fitting, a straight fitting, an angled fitting, a T-fitting, a Y-fitting, or have another geometric configuration.

Pool connection assembly 400 may include lock nut 420, connector nut 430, first gasket 440, thrust washer 450, second gasket 460, screw 471, fitting body 470, sleeve 480, and cap 490. Lock nut 420 may be configured to provide a flange on an outside of a frame, a liner, or a sidewall. Lock nut 420 may tighten against three-tube section 410 using a threaded connection. Connector nut 430 may tighten against two-tube section 410 using a threaded connection. Connector nut 430 may hold lock nut 420 against two-tube section 410. Fitting body 470 may attach to lock nut 420 via a threaded connection. Fitting body 470 may be configured to press first gasket 440, second gasket 460, and/or thrust washer 450 against lock nut 420 and/or connector nut 430. Cap 490 and sleeve 480 may be configured to keep debris or other blockages from blocking a flow of the liquid through pool connection assembly 400. Cap 490 may be configured to hold sleeve 480 against fitting body 470. Cap 490 may attach to fitting body 470 through a threaded attachment. Screw 471 may be configured to attach to fitting body 470 through a threaded attachment. Screw 471 may be configured to attach to one or more of sleeve 480 and cap 490.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing a pool hub. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. A pool assembly comprising:
   a pool;
   a pump configured to provide a liquid to the pool at a pressure;
   an outlet hose connecting the pool to the pump;
   an inlet hose connecting the pool to the pump, wherein the inlet hose extends from the pump to the pool, wherein the inlet hose comprises a first inlet hose and a second inlet hose;
   a first inlet fitting connecting the inlet hose to the pool, wherein the first inlet fitting comprises a three-tube section comprising a first hose connection, a second hose connection, and a mounting connection,
      wherein the first inlet fitting is configured to receive the liquid from the first inlet hose,
      wherein the first inlet fitting is configured to provide the liquid to the second inlet hose, and
      wherein the first inlet fitting is attached to a sidewall of the pool and contacts the sidewall of the pool.

2. The pool assembly of claim 1, wherein the second inlet hose connects the first inlet fitting to a second inlet fitting.

3. The pool assembly of claim 2, wherein the second inlet fitting is attached to the sidewall of the pool.

4. The pool assembly of claim 1, wherein the first inlet fitting comprises a valve configured to shut off a flow of the liquid to the pool.

5. The pool assembly of claim 1, wherein the first inlet fitting comprises a valve configured to shut off a flow of the liquid to the second inlet hose.

6. The pool assembly of claim 1, wherein the pool further comprises an outlet fitting, wherein the outlet fitting connects the outlet hose to the pool and comprises a valve configured to shut off a flow of the liquid.

7. The pool assembly of claim 1, wherein the pump is configured to filter the liquid.

8. The pool assembly of claim 1, wherein the pump is configured to mix chemicals into the liquid.

9. The pool assembly of claim 1, wherein the first inlet fitting is configured to measure the pressure of the liquid.

10. The pool assembly of claim 1, wherein the first inlet fitting comprises a lock nut and fitting body and wherein the mounting connection is threadingly connected to the lock nut to connect the mounting connection to an exterior of the sidewall of the pool and the fitting body is threadingly connected to the lock nut.

11. A pool comprising:
    a sidewall configured to contain a liquid;
    a pump configured to receive the liquid, wherein the pump is configured to process the liquid;
    an outlet hose configured to provide a first liquid connection between an interior of the sidewall and the pump;
    a first inlet hose configured to provide a second liquid connection between the pump and a first hose connection of a first inlet fitting, wherein the first inlet fitting comprises a three-tube section comprising a first hose connection, a second hose connection, and a mounting connection;
       wherein the first inlet fitting contacts the sidewall of the pool and is attached to the sidewall;
    a second inlet hose configured to provide a third liquid connection between the first inlet fitting and a second inlet fitting.

12. The pool assembly of claim 11, wherein the second inlet fitting is attached to the sidewall.

13. The pool assembly of claim 11, wherein the first inlet fitting comprises a valve configured to shut off a flow of the liquid to the pool.

14. The pool assembly of claim 11, wherein the first inlet fitting comprises a valve configured to shut off a flow of the liquid to the second inlet hose.

15. The pool assembly of claim 11, wherein the pool further comprises an outlet fitting, wherein the outlet fitting connects the outlet hose to the pool and comprises a valve configured to shut off a flow of the liquid.

16. The pool assembly of claim 11, wherein the pump is configured to filter the liquid.

17. The pool assembly of claim 11, wherein the pump is configured to mix chemicals into the liquid.

18. A method of assembling a pool assembly, the method including steps comprising:
    providing a first liquid connection comprising an outlet hose, wherein the outlet hose connects a liquid of a pool to a pump;
    providing a second liquid connection comprising a first inlet hose, wherein the first inlet hose connects the pump to a first hose connection of a first inlet fitting, wherein the first inlet fitting comprises a three-tube section comprising a first hose connection, a second hose connection, and a mounting connection;
       wherein the first inlet fitting is attached to a sidewall of the pool and contacts the sidewall of the pool; and
    providing a third liquid connection comprising a second inlet hose, wherein the second inlet hose connects the first inlet fitting to a second inlet fitting.

19. The method of claim 18, wherein the pump is configured to filter the liquid.

20. The method of claim 18, wherein the pump is configured to mix chemicals into the liquid.

21. The method of claim 18, wherein the first inlet fitting is configured to measure a pressure of the liquid.

* * * * *